US011271882B2

(12) United States Patent
Liebherr (10) Patent No.: US 11,271,882 B2
(45) Date of Patent: Mar. 8, 2022

(54) MESSAGE NORMALIZATION ENGINE FOR MULTI-CLOUD MESSAGING SYSTEMS

(71) Applicant: SAP SE, Walldorf (DE)

(72) Inventor: Wolf Liebherr, Bruchsal (DE)

(73) Assignee: SAP SE, Walldorf (DE)

( * ) Notice: Subject to any disclaimer, the term of this patent is extended or adjusted under 35 U.S.C. 154(b) by 119 days.

(21) Appl. No.: 16/700,418

(22) Filed: Dec. 2, 2019

(65) Prior Publication Data

US 2021/0168105 A1 Jun. 3, 2021

(51) Int. Cl.
| | |
|---|---|
| *H04L 12/58* | (2006.01) |
| *G06F 9/455* | (2018.01) |
| *G06F 8/61* | (2018.01) |
| *G06F 8/65* | (2018.01) |
| *G06F 40/40* | (2020.01) |
| *H04L 29/08* | (2006.01) |
| *H04L 51/066* | (2022.01) |
| *H04L 51/08* | (2022.01) |
| *H04L 51/224* | (2022.01) |
| *H04L 67/10* | (2022.01) |

(52) U.S. Cl.
CPC .............. *H04L 51/066* (2013.01); *G06F 8/61* (2013.01); *G06F 8/65* (2013.01); *G06F 9/45558* (2013.01); *G06F 40/40* (2020.01); *H04L 51/08* (2013.01); *H04L 51/24* (2013.01); *H04L 67/10* (2013.01); *G06F 2009/4557* (2013.01)

(58) Field of Classification Search
CPC ....... H04L 51/066; H04L 51/08; H04L 51/24; H04L 67/10; G06F 40/40; G06F 8/61; G06F 8/65; G06F 9/45558; G06F 2009/4557
See application file for complete search history.

(56) References Cited

U.S. PATENT DOCUMENTS

| | | | | |
|---|---|---|---|---|
| 10,051,042 | B2* | 8/2018 | Diwakar | G06F 9/5072 |
| 10,154,112 | B1* | 12/2018 | Anthony | G06F 3/0604 |
| 10,354,752 | B2* | 7/2019 | Higgs | G16H 10/60 |
| 10,778,597 | B1* | 9/2020 | Tan | H04L 47/70 |
| 10,965,547 | B1* | 3/2021 | Esposito | H04L 67/10 |
| 2015/0095321 | A1* | 4/2015 | Procopio | G06F 8/61 |
| | | | | 707/723 |
| 2015/0206207 | A1* | 7/2015 | Narasimhan | G06Q 30/0283 |
| | | | | 705/400 |

(Continued)

*Primary Examiner* — Ninos Donabed
(74) *Attorney, Agent, or Firm* — Mintz Levin Cohn Ferris Glovsky and Popeo, P.C.

(57) ABSTRACT

Methods and systems are described for a message normalization system for multi-cloud messaging systems. The system may include identifying a first input notification with a first cloud service provider that originated from a first cloud service provider. A second input notification is identified with a second cloud service provider that originated from a second cloud service provider. First data and second data are extracted from the first and second input notifications. The first and second data are translated into a first and second message having a predetermined standardized format. The predetermined standardized format is distinct from a first input notification format and a second input notification format. The first message and the second message are delivered to a multi-cloud messaging system, the multi-cloud messaging system hosted by a cloud service provider manager.

17 Claims, 7 Drawing Sheets

(56) References Cited

U.S. PATENT DOCUMENTS

| | | | |
|---|---|---|---|
| 2016/0127514 A1* | 5/2016 | Maksumov | H04L 41/0226 709/202 |
| 2017/0149687 A1* | 5/2017 | Udupi | H04L 47/78 |
| 2018/0288087 A1* | 10/2018 | Hittel | H04L 67/10 |
| 2018/0373552 A1* | 12/2018 | David | H04L 67/30 |
| 2019/0018717 A1* | 1/2019 | Feijoo | H04L 67/2823 |
| 2019/0097901 A1* | 3/2019 | Saxena | G06F 16/113 |
| 2019/0130286 A1* | 5/2019 | Salameh | G06N 5/022 |
| 2021/0044508 A1* | 2/2021 | Jha | G06F 9/5083 |

\* cited by examiner

MESSAGE NORMALIZATION ENGINE FOR MULTI-CLOUD MESSAGING SYSTEMS

FIELD

The present disclosure generally relates to cloud computing and, more specifically, to a message normalization engine for multi-cloud messaging systems.

BACKGROUND

In a cloud computing environment, multiple tenants may be served by a shared pool of computing resources including computer networks, servers, storage devices, applications, services, and/or the like. The cloud-computing environment may have a multi-cloud architecture in which the shared pool of computing resources are hosted by several cloud providers. Furthermore, the cloud computing environment may be a hybrid cloud computing environment that includes a mix of private cloud providers and public cloud providers.

SUMMARY

Methods, systems, and articles of manufacture, including computer program products, are provided for normalizing messages for multi-cloud messaging systems. In some implementations of the current subject matter, a system is provided. The system can include at least one data processor. The system can further include at least one memory storing instructions that result in operations when executed by the at least one data processor. The operations can include: identifying a first input notification with a first cloud service provider, the first input notification originating from a first cloud service provider; identifying a second input notification with a second cloud service provider, the second input notification originating from a second cloud service provider; extracting a first data from the first input notification; extracting a second data from the second input notification; translating the first data into a first message having a predetermined standardized format; translating the second data into a second message having the predetermined standardized format; and delivering the first message and the second message to a multi-cloud messaging system, wherein the predetermined standardized format is distinct from a first input notification format and a second input notification format.

In some variations, one or more of the features disclosed herein including the following features can optionally be included in any feasible combination. The extracting of the first data from the first message further comprises extracting, in response to identifying the first input notification with the first cloud service provider, the first data from the first input notification according to a first rule, the first rule particular to the first cloud service provider.

In some variations, the first input notification relates to an event regarding a cloud computing service of the first cloud service provider.

In some variations the event is a maintenance event, the maintenance event requiring a repair.

In some variations, the maintenance event is at least one of a malfunctioning cloud machine, a virtual machine migration, an application in need of installation, and an application in need of an update.

In some variations, a first metadata attribute is attached to the first data, the first metadata attribute related to the first cloud service provider; and a second metadata attribute is attached to the second data, the second metadata attribute related to the second cloud service provider.

In some variations, the first metadata attribute includes at least one of a customer identification, a service level agreement, or computing infrastructure data of the first cloud service provider, and wherein the second metadata attribute includes at least one of a customer identification, a service level agreement, and a computing infrastructure data of the second cloud service provider.

In some variations, the first message triggers a support operation to be performed on the first cloud service provider.

In some variations, the first data includes a unique identifier of an affected infrastructure component on the first cloud service provider and wherein the first message triggers a support operation to be performed on the affected infrastructure component associated with the unique identifier.

In some variations, the support operation performs a maintenance operation, the maintenance operation including at least one of restarting a cloud computing machine, performing a virtual machine migration, clearing a cloud computing memory, reloading an application on a cloud computing processor, installing an application on a cloud computing memory, and updating an application on a cloud computing memory.

In some variations, the translating of the first data into the first message having the predetermined standardized format further comprises utilizing a rule glossary, the rule glossary including a pre-defined set of rules for standardizing the first data to a universal cloud computing message.

In some variations, an instruction is attached to the first message, the first message including a processing rule.

In some variations, the first input notification and the second input notification are encoded in JavaScript Object Notation.

In some variations, the first message and the second message are assigned to a messaging worker in the multi-cloud messaging system, the first message and the second message configured to trigger a similar support operation on the first cloud service provider and the second cloud service provider.

In some variations, the first message and the second message are delivered to an application programming interface endpoint on the multi-cloud messaging system.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to a message normalization engine for multi-cloud messaging systems, it should be readily understood that such features are not intended to be limiting. The claims that follow this disclosure are intended to define the scope of the protected subject matter.

DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

Like labels are used to refer to same or similar items in the drawings.

DETAILED DESCRIPTION

A multi-cloud computing environment may include a shared pool of computing resources hosted by multiple cloud providers including, for example, private cloud providers, public cloud providers, and/or the like. As such, the multi-cloud computing environment may include a multitude of individual private cloud computing platforms deployed on on-premises cloud infrastructures as well as public cloud computing platforms deployed on third-party cloud infrastructures.

A cloud provider in the cloud computing environment may send distinct messages, conditions, requests, or notifications related to its portion of computing resources. Management of distinct messages, conditions, requests, or notifications from each cloud provider is susceptible to cumbersome details and various inefficiencies.

Thus, reliable and effective methods and systems for normalizing messages for multi-cloud messaging systems are needed.

The message normalization engine resolves disharmony between varying notification formats and cloud platform inconsistencies. A multi-cloud messaging system may receive various classes of messages from different cloud service providers. Each cloud service provider may have its own platform with its own cloud architecture. Instead of maintaining a variety of coding formats and languages for each of the cloud service providers, the message normalization engine standardizes each notification to a predetermined format. The predetermined format enables the multi-cloud messaging system to use a standardized or universal format to handle all notifications from each cloud service provider. That is, the task of processing each notification from the various cloud service providers is independent of the formatting of the cloud service provider. The normalization enables a singular environment for handling the variety of operational problems. The notifications from the various cloud service providers to the multi-cloud messaging system may be related to a maintenance request relating to the cloud service provider infrastructure.

Disclosed herein are systems and methods for verifying the integrity of data in a database. The system may include identifying a first input notification with a first cloud service provider that originated from a first cloud service provider. A second input notification is identified with a second cloud service provider that originated from a second cloud service provider. First data and second data are extracted from the first and second input notifications. The first and second data are translated into a first and second message having a predetermined standardized format. The predetermined standardized format is distinct from a first input notification format and a second input notification format. The first message and the second message are delivered to a multi-cloud messaging system, the multi-cloud messaging system hosted by a cloud service provider manager.

Figure 1:
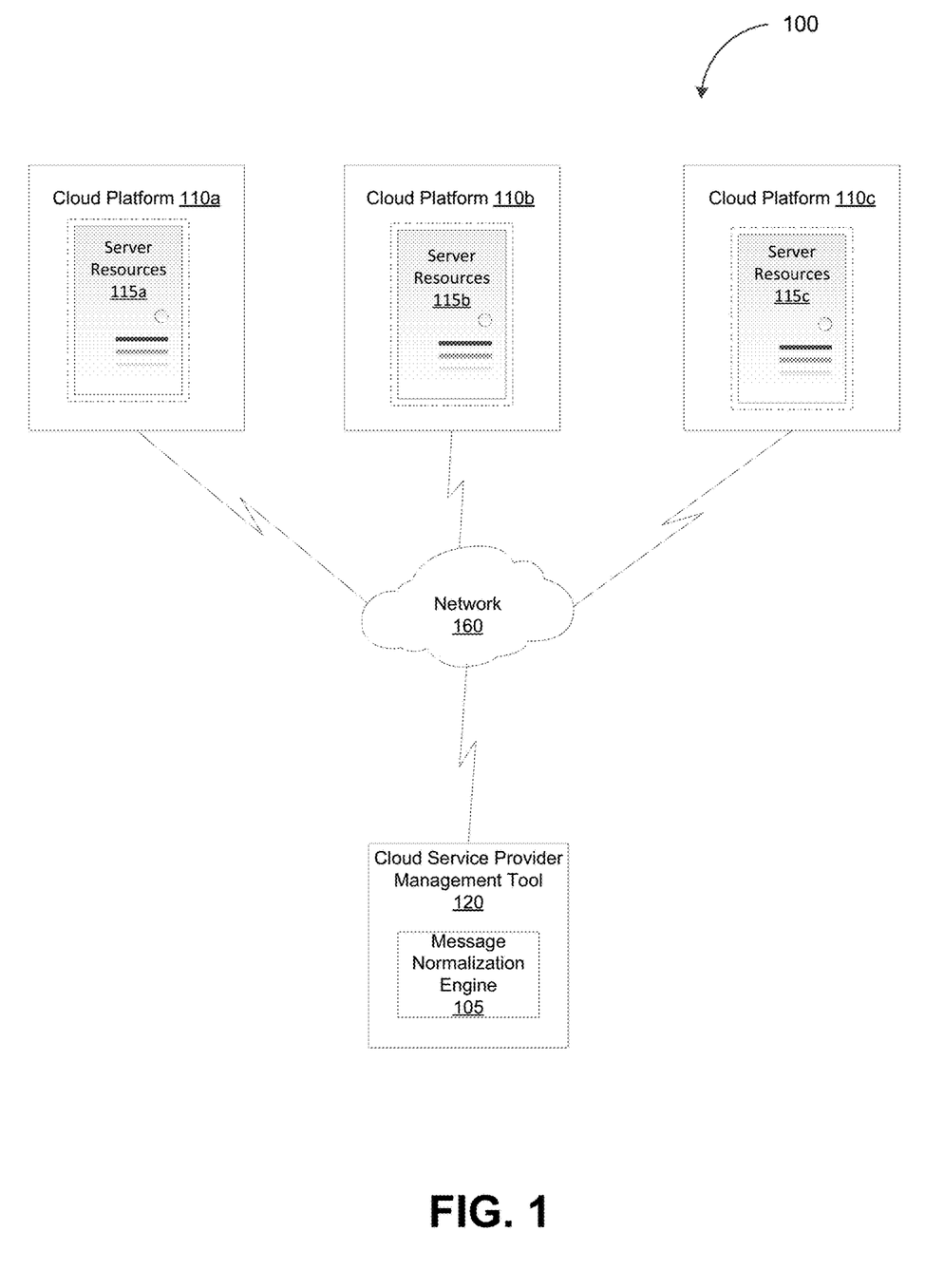
FIG. 1 depicts a system diagram illustrating a multi-cloud computing system, in accordance with some example embodiments.

FIG. 1 depicts a system diagram illustrating a multi-cloud computing system 100, in accordance with some example embodiments. The multi-cloud computing system 100 may include a multi-cloud environment having multiple cloud-computing platforms hosted on private, on-premises cloud infrastructures as well as public, third-party cloud infrastructures. For example, as shown in FIG. 1, the multi-cloud computing system 100 may include a first cloud platform 110a, a second cloud platform 110b, and a third cloud platform 110c. The first cloud platform 110a, the second cloud platform 110b, and/or the third cloud platform 110c may be public cloud platforms deployed on public, third-party cloud infrastructure. Alternatively, and/or additionally, the first cloud platform 110a, the second cloud platform 110b, and/or the third cloud platform 110c may be private cloud platforms deployed on private, on-premises cloud infrastructure. The first cloud platform 110a, the second cloud platform 110b, and the third cloud platform 110c may be communicatively coupled via a network 160, which may be any wired and/or wireless network including, for example, a local area network, a wide area network, a public land mobile network, the Internet, and/or the like.

In some example embodiments, the first cloud platform 110a, the second cloud platform 110b, and/or the third cloud platform 110c may each provide a variety of services. The first cloud platform 110a, the second cloud platform 110b, and/or the third cloud platform 110c may provide infrastructure-as-a-service (IaaS), software-as-a-service (SaaS), platform-as-a-service (PaaS), and/or the like. The first cloud platform 110a, the second cloud platform 110b, and/or the third cloud platform 110c may be associated with a first cloud service provider, a second cloud service provider, and a third cloud service provider, respectively.

Network 160 is communicatively coupled to the cloud service provider management tool 120. Cloud service provider management tool 120 is configured to receive information from the first cloud platform 110a, the second cloud platform 110b, and the third cloud platform 110c. Cloud service provider management tool 120 is configured to coordinate support operations in behalf of the first cloud platform 110a, the second cloud platform 110b, and the third cloud platform 110c.

The cloud service provider management tool 120 includes a message normalization engine 105. The message normalization engine 105 is configured to receive an input notification 210 from the first cloud platform 110a, the second cloud platform 110b, and the third cloud platform 110c. Message normalization engine 105 may be configured to standardize the input notification 210 to a universal format for the cloud service provider management tool 120.

Figure 2:
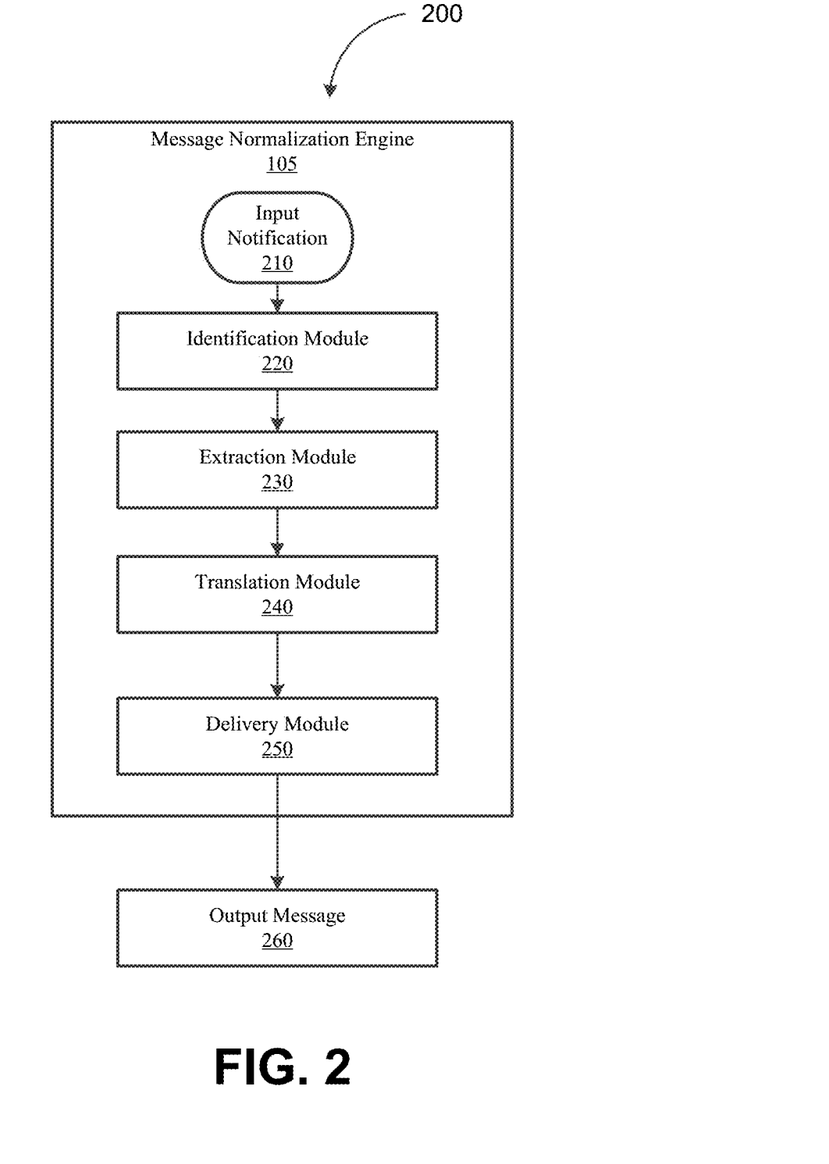
FIG. 2 depicts a block diagram illustrating a message normalization engine system, in accordance with some example embodiments.

FIG. 2 depicts a block diagram illustrating a message normalization engine system, in accordance with some example embodiments. The message normalization engine system 200 includes the message normalization engine 105. The message normalization engine 105 includes an input notification 210, an identification module 220, an extraction module 230, a translation module 240, and delivery module 250. The identification module 220 is configured to receive the input notification 210. The identification module 220 is communicatively coupled to the extraction module 230. The extraction module 230 is communicatively coupled to the translation module 240. The translation module 240 is communicatively coupled to the delivery module 250. The message normalization engine outputs a normalized output message 260.

Input notification 210 originates from at least one of the first cloud platform 110a, the second cloud platform 110b, and the third cloud platform 110c. Cloud service provider management tool 120 is configured to receive an input notification 210 from the first cloud platform 110a, the second cloud platform 110b, and the third cloud platform 110c. Input notification 210 includes data relating to at least one of the first cloud platform 110a, the second cloud platform 110b, and the third cloud platform 110c. The input notification 210 may be associated with the first cloud service provider, the second cloud service provider, and the third cloud service provider. The input notification may be encoded in the JavaScript Object Notation format. The input notification 210 may be transmitted in the JavaScript Object Notation format.

The input notification 210 may relate to an event regarding a cloud computing service on the first cloud service provider. The event may be an emulation event on a virtual machine. The event may be a maintenance event. An event may be a monitoring alarm when the computing metrics reaches a particular threshold. A maintenance event requires support from the cloud service provider manager tool 120 on at least one of the first cloud platform 110a, the second cloud platform 110b, and the third cloud platform 110c. Examples of maintenance events include a malfunctioning cloud machine, a virtual machine migration, an application in need of installation, and an application in need of an update. Other examples could be: a service outage, a service degradation, a performance problem detected by a cloud native monitoring system that is configured to use the MCM as notification handler.

The identification module 220 identifies the cloud platform 110 from which the input notification 210 originated. The identification module 220 is configured to identify or classify the input notification 210. The identification or classification may be based on the cloud service provider, the cloud platform 110, an event, a maintenance request, a cloud architecture, or a computing infrastructure unit. In some embodiments, the identification or classification may be determined by a message format. The identification or classification may be based on an endpoint within the cloud service provider manager. The endpoint may be identified using a webhook, a file address, or a uniform resource locator (URL). Examples of resource locators include: "/notifications/azure/," "/notifications/aws/vm" "/notifications/aws/vm" "/notifications/generic/monitoring/performancer" "/notifications/generic/monitoring/availability/." The classification may provide information regarding the extraction of data for the extraction module 230. In some example embodiments, a first input notification is identified with a first cloud service provider, the first input notification originating from a first cloud service provider, and a second input notification is identified with a second cloud service provider, the second input notification originating from a second cloud service provider.

The extraction module 230 is configured to extract data from the input notification 210. The extraction module 230 may extract the data from the input notification 210 depending on the identity or class of the input notification 210, as determined by the identification module 220. The extraction module 230 extracts relevant information from the input notification 210, such as a unique identifier of an affected computing infrastructure unit. In some example embodiments, the extraction module 230 extracts a first data from the first input notification and extracts a second data from the second input notification. In some embodiments, the extraction module 230 extracts an account identification associated with the cloud service provider, an affected instance identification, and a deadline for responding from the input notification 210. The account identification may be matched to a specific customer id and the instance identification may be attached to a certain host.

The extraction module 230 may elect to extract data after the identification module 220 has identified the input notification 210. The extraction module 230 may use a rule to extract data from the input notification 210. The rule may be associated with a particular cloud service provider designed to aid in extracting relevant information. The rule may provide an instruction for extracting data, provide an algorithm for extracting relevant data, or refer to a table for identifying relevant information. In some example embodiments, the extraction module 230 extracts the first data from the first input notification according to a first rule, in response to identifying the first input notification with the first cloud service provider. The extraction module 230 may also extract the second data from the second input notification according to a second rule, in response to identifying the second input notification with the second cloud service provider. The first rule and the second rule are particular to the first cloud service provider and the second cloud service provider, respectively.

The translation module 240 is configured to take the extracted data and translate the extracted data into a standardized format. The translation module 240 is configured to generate a message, including the standardized data, to be delivered to the cloud service provider management tool 120. In some example embodiments, the translation module 240 translates the first data into a first message having a predetermined standardized format and translates the second data into a second message having the predetermined standardized format.

The generated message may trigger a support operation to be performed on the cloud platform 110 by the cloud service provider management tool 120. The generated message may trigger a support operation to be performed on the affected infrastructure component associated with a unique identifier extracted from the input notification 210. The support operation may include restarting a cloud computing machine, performing a virtual machine migration, clearing a cloud computing memory, reloading an application on a cloud computing processor, installing an application on a cloud computing memory, and updating an application on a cloud computing memory. The support operation may be performed by the cloud service provider and/or the cloud service provider management tool 120. Other examples could be: a service outage, a service degradation, a performance problem detected by a cloud native monitoring system that is configured to use the MCM as notification handler.

The predetermined standardized format is distinct from a first input notification format and a second input notification format. The predetermined standardized format is configured to rules for standardizing extracted data to a universal cloud computing message for cloud service provider management tool 120. A rule glossary may be used for standardizing the extracted input notification 210. The rule glossary may include using a pre-defined set of rules for standardizing the first data to a universal cloud computing message. In some example embodiments, the pre-defined set of rules includes a rule that capitalizes certain attributes to maintain a standardized format.

In some embodiments, a controller may read the predetermined standardized format to coordinate activities with the cloud service providers. Some examples of messages in a predetermined standardized message are shown in the table below.

The delivery module 250 is configured to receive a message from the translation module 240. The delivery module 250 may attach an instruction to messages for the cloud service provider management tool 120. In some example embodiments, an instruction or information from a configuration management database may be attached to the message. The deliver module 250 may attach a processing rule associated with the cloud service provider and/or cloud platform 110. As an example, the processing rule may be a reboot protocol. The message may include metadata gathered from a database maintained by the cloud service provider management tool 120. In some example embodiments, a first message and a second message are delivered to a multi-cloud messaging system, the multi-cloud messaging system hosted by a cloud service provider management tool 120.

The delivery module 250 may assign a message to a message worker in the cloud service provider management tool 120. Alternatively and/or additionally, the delivery module 250 may deliver the message to an application programming interface endpoint on the multi-cloud messaging system. More specifically, the delivery module 250 may deliver the message to an application programming interface endpoint on the cloud service provider messaging system 310. The delivery module 250 may group messages together based on a maintenance operation, a cloud service provider, a cloud platform, or operations that are to be performed simultaneously. In some example embodiments, the delivery module 250 may assign the first message and the second message to the same messaging worker in the multi-cloud messaging system, the first message and the second message configured to trigger a similar support operation on the first cloud service provider and the second cloud service provider.

Figure 3:
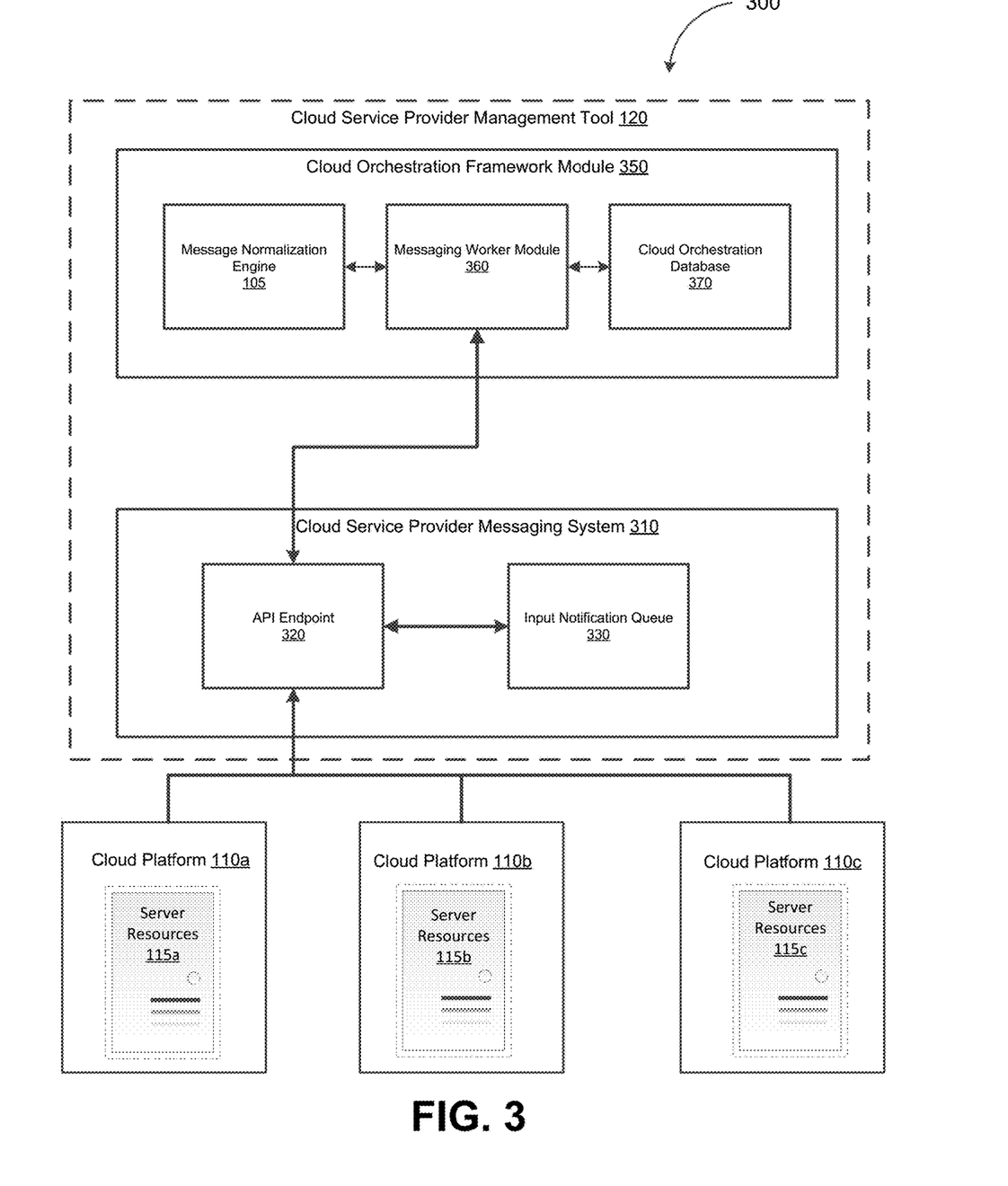
FIG. 3 depicts a block diagram illustrating a cloud service provider management tool, in accordance with some example embodiments.

FIG. 3 depicts a block diagram illustrating a cloud service provider management tool, in accordance with some example embodiments. The cloud service provider messaging system 300 includes a cloud service provider messaging system 310 and a cloud orchestration framework module

TABLE 1

| Name | Required/Optional | Allowed values | Description | Example |
| --- | --- | --- | --- | --- |
| tic_alert_cloud_environment | required | AWS/Azure/GCP/ACS | Cloud environment | AWS |
| tic_alert_severity | required | RED/YELLOW/— | Indicates the criticality | YELLOW |
| tic_alert_customer_id | required | [A-Z][3] | HEC-specificcustomer ID (CID) | ABC |
| tic_alert_host_name | optional | Hecxx . . . | Host name according to HEC naming convention | Hec42v100101 |
| tic_alert_system_id | optional | [A-Z][3] | SAP System ID affected | AP1 |

The translation module 240 may attach a metadata attribute to the extracted data. The metadata attribute relates to at least one of the first cloud platform 110a, the second cloud platform 110b, and the third cloud platform 110c. A metadata attribute may include a customer identification, a service level agreement, a computing infrastructure data of the cloud platform, and/or cloud service provider. The metadata attribute may be information gathered from a contract database, a configuration management database, or a cloud management database. In some example embodiments, the translation module 240 attaches a first metadata attribute to the first data, the first metadata attribute relating to the first cloud service provider, and attaches a second metadata attribute to the second data, the second metadata attribute relating to the second cloud service provider.

The delivery module 250 is configured to deliver a message to the cloud service provider management tool 120.

350. The cloud service provider messaging system 310 includes an (Application Programming Interface) API endpoint 320 and an input notification queue 330. The cloud orchestration framework module 350 includes the message normalization engine 105, a messaging worker module 360, and a cloud orchestration database 370. The first cloud platform 110a, the second cloud platform 110b, and the third cloud platform 110c are communicatively coupled to the API endpoint 320 of the cloud service provider messaging system 310. The API endpoint 320 is communicatively coupled to the input notification queue 330 and the first cloud platform 110a, the second cloud platform 110b, and the third cloud platform 110c. The input notification queue 330 is communicatively coupled to the API endpoint 320. The API endpoint 320 may be communicatively coupled to the messaging worker module 360 in the cloud orchestration framework module 350. The messaging worker module 360 may be communicatively coupled to the message normalization engine 105, the cloud orchestration database 370, and the API endpoint 320. The cloud orchestration is communicatively coupled to the messaging worker module 360. The message normalization engine 105 is coupled to the messaging worker module 360.

The cloud service provider messaging system 310 is configured to receive an input notification 210 from the first cloud platform 110a, the second cloud platform 110b, and the third cloud platform 110c. The cloud service provider manages the notifications in the input notification queue 330. The cloud service provider messaging system 310 may send the input notification 210 to the messaging worker module 360 to be normalized or standardized before being further processed by the cloud service provider management tool 120. Alternatively, and/or additionally, the messaging worker module 360 may be configured to fetch messages from the input notification queue 330. The cloud service provider messaging system 310 may be integrated into another component or module of the cloud service provider management tool 120.

The API endpoint 320 is configured to enable the cloud service provider management tool 120 to communicate with the first cloud platform 110a, the second cloud platform 110b, and the third cloud platform 110c. The API endpoint 320 includes documentation and specifications determining how information is transferred between the first cloud platform 110a, the second cloud platform 110b, and the third cloud platform 110c and the cloud service provider management tool 120. The API endpoint 320 may use HTTP requests to obtain information from cloud service provider management tool 120 in behalf of the first cloud platform 110a, the second cloud platform 110b, and the third cloud platform 110c. The API endpoint may be SOAP-based or REST-based to access the cloud service provider management tool 120.

The input notification queue 330 holds the input notification 210 from the first cloud platform 110a, the second cloud platform 110b, and the third cloud platform 110c. The input notification queue 330 receives the input notification 210 through the API endpoint 320. The input notification queue 330 stores the input notification 210 until ready for further processing by the message normalization engine 105. Multiple individual queues may comprise the input notification queue 330. An individual queue may be prioritized ahead of the other queues in the input notification queue 330. The queues may be organized by: the source of the input notification 210, the cloud platform that generated the input notification 210, an urgency associated with the input notification 210, the capability of the message normalization engine 105 to process the input notification 210, a service-level agreement, or the event associated with the input notification 210.

The cloud orchestration framework module 350 provides a computing architecture through which an input notification 210 is coordinated with the cloud service provider management tool 120. The cloud orchestration framework module 350 manages the incoming input notification 210 through the coordinated efforts of the messaging worker module 360 and the message normalization engine 105. A normalized or standardized message may be stored in the cloud orchestration database 370. The cloud orchestration framework module 350 may manage other tasks for the cloud service provider management tool 120.

The messaging worker module 360 identifies, monitors, and coordinates the input notification 210. The messaging worker module 360 may be configured to fetch messages from the input notification queue 330. The coordination of input notifications may occur before and/or after the normalization of the input notification 210. The messaging worker module 360 may assign one input notification 210 to a single message worker. Alternatively, and/or additionally, the messaging worker module 360 assigns multiple input notifications to a single message worker. The messaging worker module 360 may assign the input notification 210 to a group based on a maintenance operation, a cloud service provider, a cloud platform, or operations that are to be performed simultaneously. The messaging worker module 360 may be structured to have hundreds of queues capable of holding thousands of messages. The messaging worker module 360 may be structured to have one or two queues capable of holding millions of messages. The messaging worker module 360 may be structured to scale up or down the number of queues based on the number of tasks.

The cloud orchestration database 370 stores metadata, rules, processing rules, extraction rules, translation rules, rule glossaries, and other information associated with the first cloud platform 110a, the second cloud platform 110b, and the third cloud platform 110c. Alternatively, and/or additionally, the cloud orchestration database 370 stores support operations and maintenance responses. The cloud orchestration database 370 may select metadata, rules, processing rules, extraction rules, translation rules, rule glossaries, and other information to attach to the normalized message. The cloud orchestration database 370 may select a support operation or a maintenance response based on the normalized message from the message normalization engine 105.

As depicted in FIG. 3, the message normalization engine 105 may be separate from the cloud service provider messaging system and integrated into the cloud orchestration framework module 350. Alternatively, and/or additionally, the message normalization engine 105 may be directly incorporated into the messaging worker module 360 as a submodule. Alternatively, and/or additionally, the message normalization engine 105 may be deployed as an additional module in the cloud service provider messaging system 310. Alternatively, and/or additionally, the message normalization engine 105 may be deployed as an additional module in the API endpoint 320.

Figure 4:
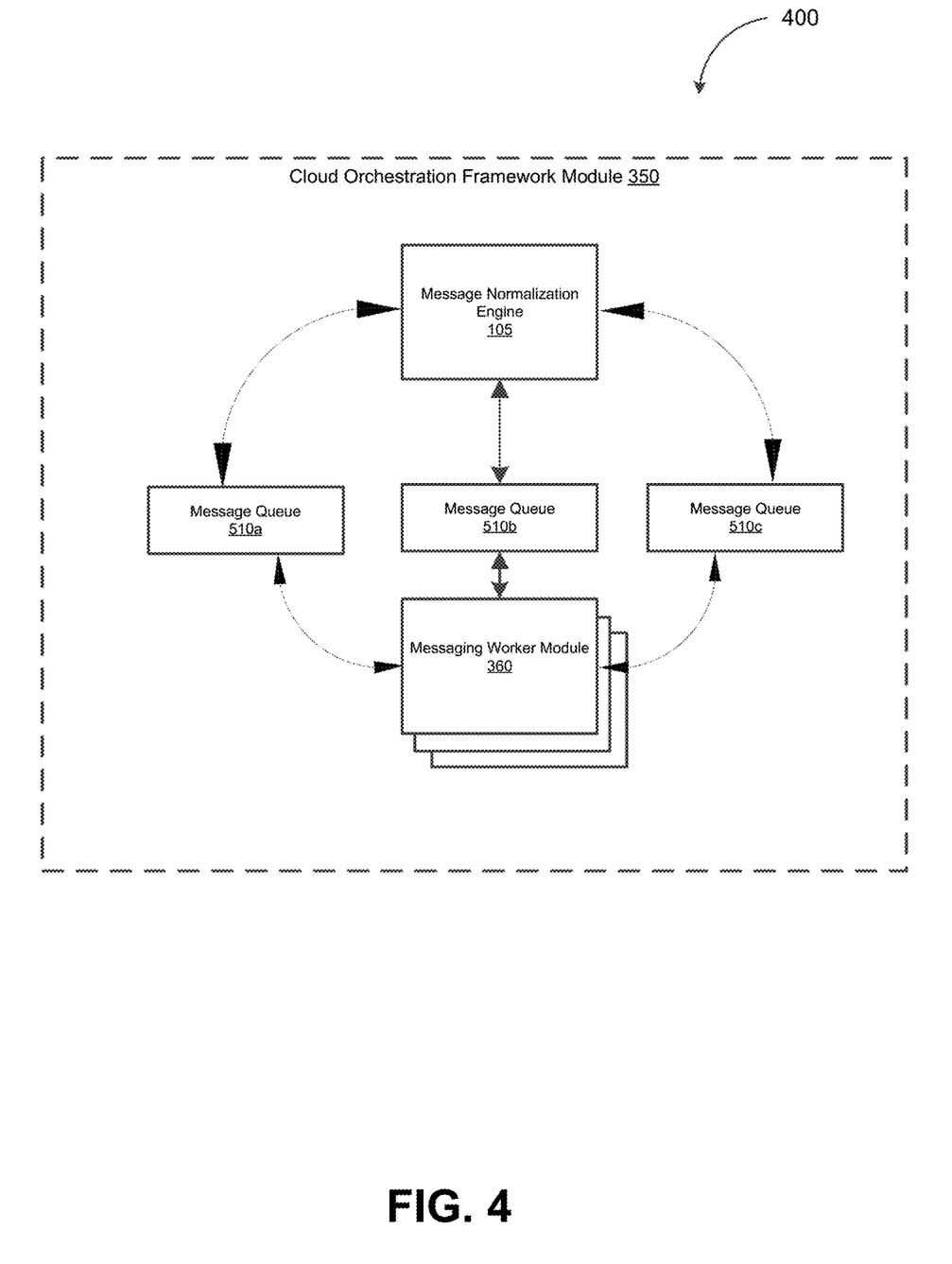
FIG. 4 depicts a block diagram illustrating a cloud orchestration framework module, in accordance with some example embodiments.

FIG. 4 depicts a block diagram illustrating a cloud orchestration framework module, in accordance with some example embodiments. The cloud orchestration framework block diagram 400 illustrates another method by which the input notification 210 may be coordinated using the cloud orchestration framework module 350. The cloud orchestration framework module 350 includes the message normalization engine 105, the messaging worker module 360, a first message queue 510a, a second message queue 510b, and a third message queue 510c. The message normalization engine 105 is communicatively coupled to the first message queue 510a, the second message queue 510b, and the third message queue 510c. The messaging worker module 360 may be communicatively coupled to the first message queue 510a, the second message queue 510b, and the third message queue 510c.

The sorting of input notifications into the first message queue 510a, the second message queue 510b, and the third message queue 510c may occur before and/or after the normalization of the input notification 210. The messaging worker module 360 may organize the input notification 210 into the first message queue 510a, the second message queue 510b, and the third message queue 510c based on a maintenance operation, a cloud service provider, a cloud platform, or operations that are to be performed simultaneously. The message normalization engine 105 may process all of the input notifications from the first message queue 510*a* before processing the input notifications from the second message queue 510*b*. Alternatively, and/or additionally, the message normalization engine 105 may process the input notification 210 based on the individual queue from which the input notification 210 was selected. Alternatively, and/or additionally, the message normalization engine 105 may prioritize the input notification 210 by the source of the input notification 210, the cloud platform that generated the input notification 210, an urgency associated with the input notification 210, the capability of the message normalization engine 105 to process the input notification 210, a service-level agreement, or the event associated with the input notification 210. In at least one embodiment, the message normalization engine 105 prioritizes an input notification 210 associated with a "very high" alarm triggered by a complete outage of a cloud service provider. The input notification 210 may be prioritized by a configured webhook pointing to an API endpoint that forwards the message to a message queue with near real-time processing. Alternatively, and/or additionally, the messaging worker may process all of the input notifications from the first message queue 510*a* before processing the input notifications from the second message queue 510*b*. Alternatively, and/or additionally, the messaging worker may process all of the input notifications from the second message queue 510*b* before processing the input notifications from the third message queue 510*c*.

Figure 5:
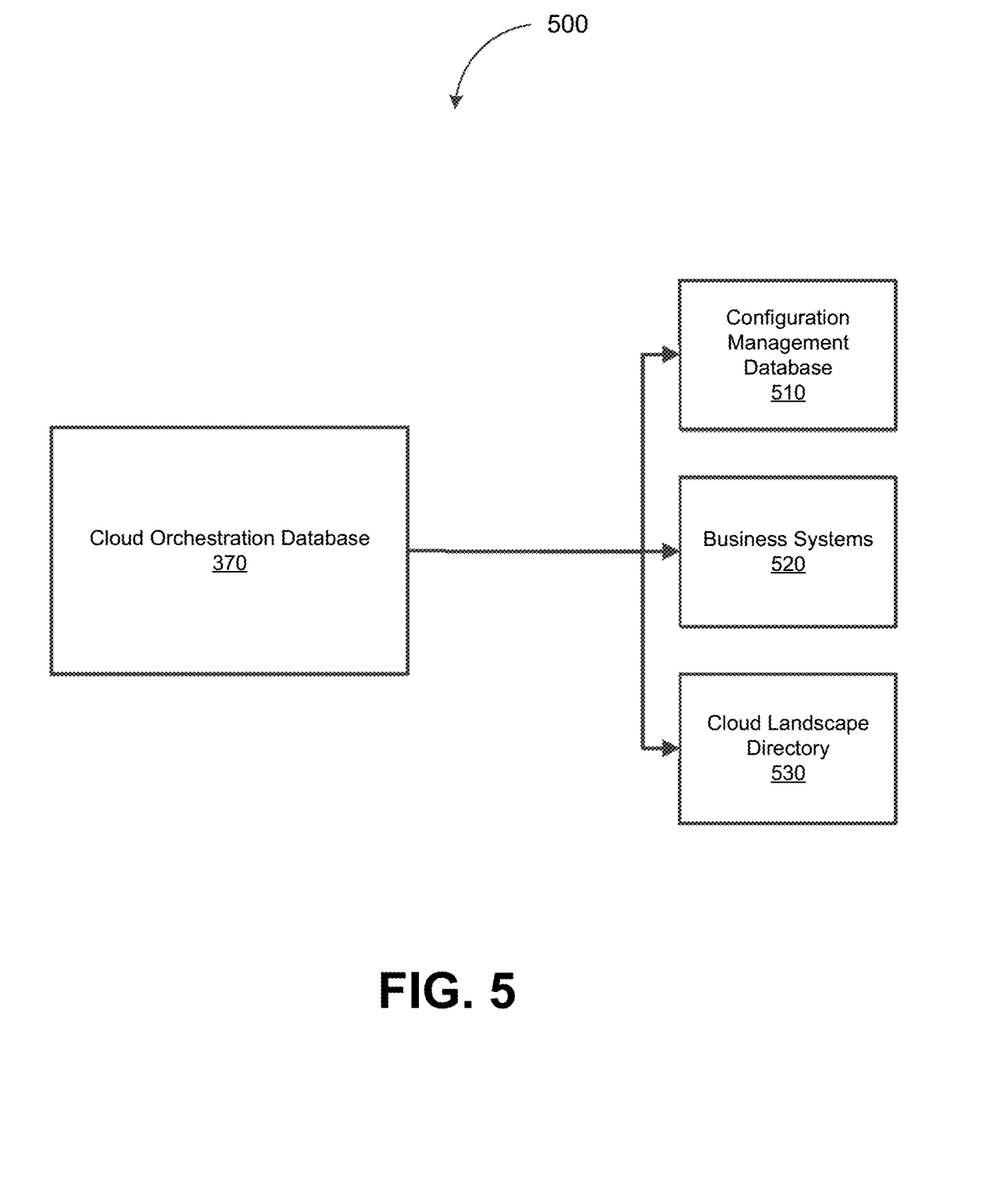
FIG. 5 depicts a block diagram illustrating a cloud orchestration database system, in accordance with some example embodiments.

FIG. 5 depicts a block diagram illustrating a cloud orchestration database system, in accordance with some example embodiments. The cloud orchestration database system 500 includes the cloud orchestration database 370, the configuration management database 510, a business systems database 520, and a cloud landscape directory 530. The cloud orchestration database system 500 is communicatively coupled to the cloud orchestration database, the configuration management database 510, a business systems database 520, and a cloud landscape directory 530.

The cloud orchestration database 370 exchanges and receives information related to the first cloud platform 110*a*, the second cloud platform 110*b*, and the third cloud platform 110*c* with the configuration management database 510. The configuration management database 510 stores the functional operations controlling the infrastructure on the first cloud platform 110*a*, the second cloud platform 110*b*, and the third cloud platform 110*c*. Alternatively, and or additionally, the configuration management database 510 stores the software capable of controlling the virtual machines on the first cloud platform 110*a*, the second cloud platform 110*b*, and the third cloud platform 110*c*.

The cloud orchestration database 370 exchanges and receives information related to the first cloud platform 110*a*, the second cloud platform 110*b*, and the third cloud platform 110*c* with the business systems database 520. The business systems database 520 stores tools based on the storage class of the first cloud platform 110*a*, the second cloud platform 110*b*, and the third cloud platform 110*c*. The tools may be management tools for various cloud platforms. The business systems database 520 enables the cloud service provider manager tool 120 to have access to all of the configuration information in one central location.

The cloud orchestration database 370 exchanges and receives information related to the first cloud platform 110*a*, the second cloud platform 110*b*, and the third cloud platform 110*c* with the cloud landscape directory 530. The cloud landscape directory 530 provides application management-level information related to the first cloud platform 110*a*, the second cloud platform 110*b*, and the third cloud platform 110*c*.

Figure 6:
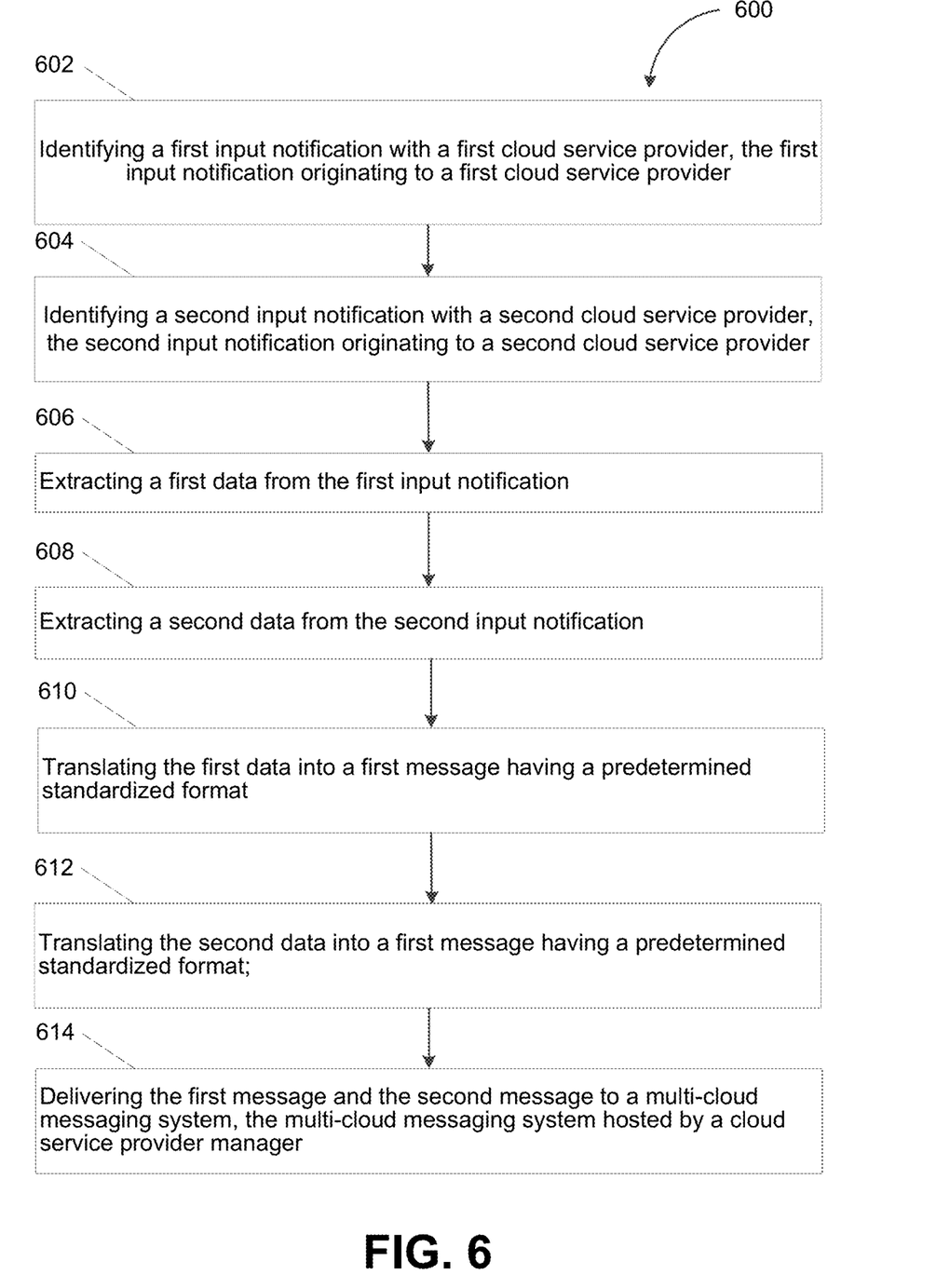
FIG. 6 depicts a flowchart illustrating a process for a message normalization engine for multi-cloud messaging systems, in accordance with some example embodiments.

FIG. 6 depicts a flowchart 600 illustrating a process for a message normalization engine for multi-cloud messaging systems, in accordance with some example embodiments.

At 602, the process identifies a first input notification with a first cloud service provider, the first input notification originating from a first cloud service provider. For example, identification module 220 is configured to identify or classify the input notification 210. The identification or classification may be based on the first cloud platform 110*a*. The first cloud service provider may run various virtual devices, virtual computer, and virtual machines.

At 604, the process identifies a second input notification with a second cloud service provider, the second input notification originating from a second cloud service provider. For example, identification module 220 is configured to identify or classify the input notification 210. The identification or classification may be based on the second cloud platform 110*b*.

At 606, the process extracts a first data from the first input notification. For example, the extraction module 230 extracts relevant information from the input notification 210, such as a unique identifier of an affected computing infrastructure unit. The extracted data may be technical information related to the first cloud platform 110*a*, such as computing metrics event triggering a monitoring alarm. The extraction module 230 may have to discern between meaningless strings and valuable technical information in extracting the first data.

At 608, the process extracts a second data from the second input notification. For example, the extraction module 230 extracts relevant information from the input notification 210, such as a unique identifier of an affected computing infrastructure unit. The extracted data may be a CPU-related problem on a machine on the second cloud platform 110*b*. The extraction module 230 may have to, for example, discern a session of the reboot and accordingly ignore future messages until reboot is complete.

At 610, the process translates the first data into a first message having a predetermined standardized format. For example, translation module 240 translates the extracted data to a standardized format. Translating to a standardized format means turning the extracted data into a universal cloud computing message for cloud service provider management tool 120. The predetermined standardized format may follow a set of rules for normalizing strings to a universal format. The predetermined standardized format may follow a set of rules for differentiating between the different types of statuses.

At 612, the process translates the second data into a second message having the predetermined standardized format. The predetermined standardized format is distinct from a first input notification format and a second input notification format. For example, translation module 240 translates the extracted data to a standardized format. Translating to a standardized format means turning the extracted data into a universal cloud computing message for cloud service provider management tool 120. The predetermined standardized format may follow a set of rules for differentiating between types of infrastructure of the cloud platform 110. The predetermined standardized format may follow a set of rules for differentiating between the components on the cloud platform 110.

At 614, the process delivers the first message and the second message to a multi-cloud messaging system, the multi-cloud messaging system hosted by a cloud service provider manager. For example, the delivery module 250 delivers a message to the cloud service provider management tool 120. The delivery module 250 may deliver a message to a messaging worker module 360.

Figure 7:
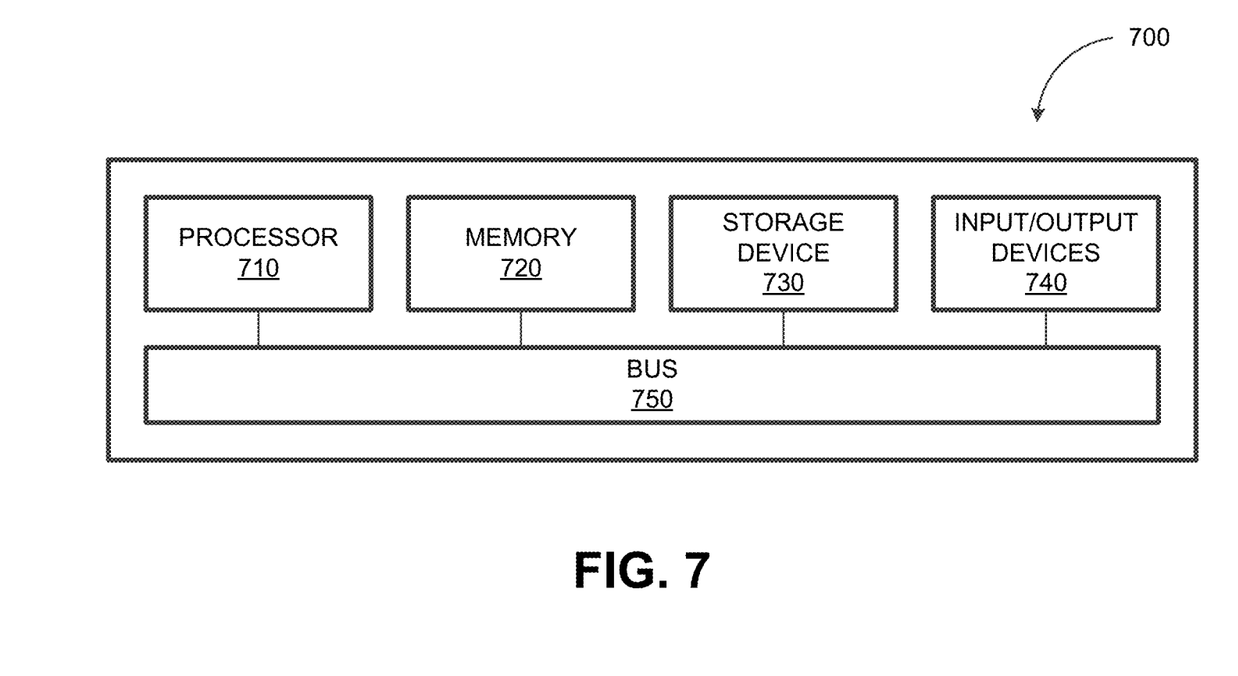
FIG. 7 depicts a block diagram illustrating a computing system consistent with implementations of the current subject matter.

FIG. 7 depicts a block diagram illustrating a computing system 700 consistent with implementations of the current subject matter. Referring to FIGS. 1-7, the computing system 700 can be used to implement the message normalization engine 105 and/or any components therein.

As shown in FIG. 7, the computing system 700 can include a processor 710, a memory 720, a storage device 730, and input/output devices 740. The processor 710, the memory 720, the storage device 730, and the input/output devices 740 can be interconnected via a system bus 750. The processor 710 is capable of processing instructions for execution within the computing system 700. Such executed instructions can implement one or more components of, for example, the message normalization engine 105. In some implementations of the current subject matter, the processor 710 can be a single-threaded processor. Alternately, the processor 710 can be a multi-threaded processor. The processor 710 is capable of processing instructions stored in the memory 720 and/or on the storage device 730 to display graphical information for a user interface provided via the input/output device 740.

The memory 720 is a computer-readable medium such as volatile or non-volatile that stores information within the computing system 700. The memory 720 can store data structures representing configuration object databases, for example. The storage device 730 is capable of providing persistent storage for the computing system 700. The storage device 730 can be a floppy disk device, a hard disk device, an optical disk device, or a tape device, or other suitable persistent storage means. The input/output device 740 provides input/output operations for the computing system 700. In some implementations of the current subject matter, the input/output device 740 includes a keyboard and/or pointing device. In various implementations, the input/output device 740 includes a display unit for displaying graphical user interfaces.

According to some implementations of the current subject matter, the input/output device 740 can provide input/output operations for a network device. For example, the input/output device 740 can include Ethernet ports or other networking ports to communicate with one or more wired and/or wireless networks (e.g., a local area network (LAN), a wide area network (WAN), the Internet).

In some implementations of the current subject matter, the computing system 700 can be used to execute various interactive computer software applications that can be used for organization, analysis and/or storage of data in various (e.g., tabular) format (e.g., Microsoft Excel®, and/or any other type of software). Alternatively, the computing system 700 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning add-in for Microsoft Excel as part of the SAP Business Suite, as provided by SAP SE, Walldorf, Germany) or can be stand-alone computing products and/or functionalities. Upon activation within the applications, the functionalities can be used to generate the user interface provided via the input/output device 740. The user interface can be generated and presented to a user by the computing system 700 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include users and servers. A user and server are generally remote from each other and typically interact through a communication network. The relationship of user and server arises by virtue of computer programs running on the respective computers and having a user-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows can include different and/or additional operations than shown without departing from the scope of the present disclosure. One or more operations of the logic flows can be repeated and/or omitted without departing from the scope of the present disclosure. Other implementations can be within the scope of the following claims.

In the following description, for purposes of explanation, numerous specific details are set forth in order to provide a thorough understanding of the various embodiments. It should be understood that other embodiments may be utilized, and structural changes may be made without departing from the scope of the disclosed subject matter. Any combination of the following features and elements is contemplated to implement and practice the disclosure.

In the description, common or similar features may be designated by common reference numbers. As used herein, "exemplary" may indicate an example, an implementation, or an aspect, and should not be construed as limiting or as indicating a preference or a preferred implementation.

What is claimed is:

1. A system, comprising:
    at least one data processor; and
    at least one memory storing instructions which, when executed by the at least one data processor, result in operations comprising:
        identifying, at a message normalization engine of a cloud service provider management tool, a first input notification with a first cloud service provider, the first input notification originating from the first cloud service provider via an application program endpoint at a multi-cloud messaging system of the cloud service provider management tool;
        identifying, at the message normalization engine, a second input notification with the second cloud service provider, the second input notification originating from a second cloud service provider via the application program endpoint at the multi-cloud messaging system of the cloud service provider management tool;
        extracting, at the message normalization engine, a first data from the first input notification;
        extracting, at the message normalization engine, a second data from the second input notification;
        translating, at the message normalization engine, the first data into a first message having a predetermined standardized format, wherein the translating the first data into the first message is based on a first set of pre-defined rules for the first cloud service provider, wherein the first set of pre-defined rules are obtained from a database at the cloud service provider management tool, wherein the first data includes a unique identifier of an affected infrastructure component on the first cloud service provider, wherein the first message triggers a support operation to be performed on the affected infrastructure component associated with the unique identifier, wherein the support operation performs a maintenance operation that includes at least one of restarting a cloud computing machine, performing a virtual machine migration, clearing a cloud computing memory, reloading an application on a cloud computing processor, installing an application on a cloud computing memory, and updating an application on a cloud computing memory;
        translating, at the message normalization engine, the second data into a second message having the predetermined standardized format, wherein the translating the second data into the second message is based on a second set of pre-defined rules for the second cloud service provider, wherein the second set of pre-defined rules are obtained from the database at the cloud service provider management tool; and
        delivering, at the message normalization engine, the first message and the second message to the multi-cloud messaging system,
        wherein the predetermined standardized format is distinct from a first input notification format and/or a second input notification format.

2. The system of claim 1, wherein the extracting the first data from the first message further comprises:
    extracting, in response to identifying the first input notification with the first cloud service provider, the first data from the first input notification according to a first rule, the first rule particular to the first cloud service provider.

3. The system of claim 1, wherein the first input notification relates to an event regarding a cloud computing service of the first cloud service provider.

4. The system of claim 3, wherein the event is a maintenance event, the maintenance event requiring a repair.

5. The system of claim 4, wherein the maintenance event is at least one of a malfunctioning cloud machine, a virtual machine migration, an application in need of installation, and an application in need of an update.

6. The system of claim 1, further comprising:
    attaching a first metadata attribute to the first data, the first metadata attribute related to the first cloud service provider; and
    attaching a second metadata attribute to the second data, the second metadata attribute related to the second cloud service provider.

7. The system of claim 6, wherein the first metadata attribute includes at least one of a customer identification, a service level agreement, or computing infrastructure data of the first cloud service provider, and wherein the second metadata attribute includes at least one of a customer identification, a service level agreement, and a computing infrastructure data of the second cloud service provider.

8. The system of claim 1, wherein the first message triggers a support operation to be performed on the first cloud service provider.

9. The system of claim 1, wherein the translating the first data into the first message having the predetermined standardized format further comprises utilizing a rule glossary, the rule glossary including a pre-defined set of rules for standardizing the first data to a universal cloud computing message.

10. The system of claim 1, further comprising:
attaching an instruction to the first message, the first message including a processing rule.

11. The system of claim 1, wherein the first input notification and the second input notification are encoded in JavaScript Object Notation.

12. The system of claim 1, further comprising:
assigning the first message and the second message to a messaging worker in the multi-cloud messaging system, the first message and the second message configured to trigger a same support operation on the first cloud service provider and the second cloud service provider.

13. A method, comprising:
identifying, at a message normalization engine of a cloud service provider management tool, a first input notification with a first cloud service provider, the first input notification originating from the first cloud service provider via an application program endpoint at a multi-cloud messaging system of the cloud service provider management tool;
identifying, at the message normalization engine, a second input notification with a second cloud service provider, the second input notification originating from the second cloud service provider via the application program endpoint at the multi-cloud messaging system of the cloud service provider management tool;
extracting, at the message normalization engine, a first data from the first input notification;
extracting, at the message normalization engine, a second data from the second input notification;
translating, at the message normalization engine, the first data into a first message having a predetermined standardized format, wherein the translating the first data into the first message is based on a first set of pre-defined rules for the first cloud service provider, wherein the first set of pre-defined rules are obtained from a database at the cloud service provider management tool, wherein the first data includes a unique identifier of an affected infrastructure component on the first cloud service provider, wherein the first message triggers a support operation to be performed on the affected infrastructure component associated with the unique identifier, wherein the support operation performs a maintenance operation that includes at least one of restarting a cloud computing machine, performing a virtual machine migration, clearing a cloud computing memory, reloading an application on a cloud computing processor, installing an application on a cloud computing memory, and updating an application on a cloud computing memory;
translating, at the message normalization engine, the second data into a second message having the predetermined standardized format, wherein the translating the second data into the second message is based on a second set of pre-defined rules for the second cloud service provider, wherein the second set of pre-defined rules are obtained from the database at the cloud service provider management tool; and
delivering, at the message normalization engine, the first message and the second message to the multi-cloud messaging system, wherein the predetermined standardized format is distinct from a first input notification format and/or a second input notification format.

14. The method of claim 13, wherein the extracting of the first data from the first message further comprises:
extracting, in response to identifying the first input notification with the first cloud service provider, the first data from the first input notification according to a first rule, the first rule particular to the first cloud service provider.

15. The method of claim 13, wherein the first input notification relates to an event regarding a cloud computing service of the first cloud service provider.

16. The method of claim 15, wherein the event is a maintenance event, the maintenance event requiring a repair.

17. A non-transitory computer-readable medium storing instructions, which when executed by at least one data processor, result in operations comprising:
identifying, at a message normalization engine of a cloud service provider management tool, a first input notification with a first cloud service provider, the first input notification originating from the first cloud service provider via an application program endpoint at a multi-cloud messaging system of the cloud service provider management tool;
identifying, at the message normalization engine, a second input notification with a second cloud service provider, the second input notification originating from the second cloud service provider via the application program endpoint at the multi-cloud messaging system of the cloud service provider management tool;
extracting, at the message normalization engine, a first data from the first input notification;
extracting, at the message normalization engine, a second data from the second input notification;
translating, at the message normalization engine, the first data into a first message having a predetermined standardized format, wherein the translating the first data into the first message is based on a first set of pre-defined rules for the first cloud service provider, wherein the first set of pre-defined rules are obtained from a database at the cloud service provider management tool, wherein the first data includes a unique identifier of an affected infrastructure component on the first cloud service provider, wherein the first message triggers a support operation to be performed on the affected infrastructure component associated with the unique identifier, wherein the support operation performs a maintenance operation that includes at least one of restarting a cloud computing machine, performing a virtual machine migration, clearing a cloud computing memory, reloading an application on a cloud computing processor, installing an application on a cloud computing memory, and updating an application on a cloud computing memory;
translating, at the message normalization engine, the second data into a second message having the predetermined standardized format, wherein the translating the second data into the second message is based on a second set of pre-defined rules for the second cloud service provider, wherein the second set of pre-defined rules are obtained from the database at the cloud service provider management tool; and
delivering, at the message normalization engine, the first message and the second message to the multi-cloud messaging system, wherein the predetermined standardized format is distinct from a first input notification format and/or a second input notification format.

\* \* \* \* \*